may be inserted therein to effect the uniform dispersion. The most important matter is, therefore, the formation of the film of the solidified, fused salt on the inner wall thereof and a wet flowing film thereon. When the fluid mixture is cooled by the steam formation in the heat transfer pipe, the inner wall of the heat transfer pipe is wetted by the fused salt. For example, if 120 kg/cm² of steam is formed, the temperature is 320° C. and a thin solidified film of the fused salt is formed on the inner wall of the heat transfer pipe. The solidified film prevents the deposition of coke and tar on the inner wall, through it damages the heat transfer. Temperature of the surface of the solidified film is made higher by the cracking products, whereby the fused state is maintained and the solidified film is continuously renewed.

If only the wet flowing film is formed without forming the solidified film on the surface, there is a fear that coke or tarry substance is directly contacted with the inner wall of the heat transfer pipe. If coke or tarry substance once adheres to the inner wall, it can no more be removed. However, if the solidified film is formed and it is continuously renewed, coke and tarry substance once adhered thereto can be removed easily. When the raw hydrocarbons contain a large amount of heavy fractions, it is advantageous to supply an additional amount of the fused salt as described above. When the raw hydrocarbons contain a small amount of heavy fractions, means for separating out the fused salt may be provided ahead the quenching device.

Thickness of the solidified film is varied depending on temperature of the cracking products at the outlet of the quenching device and also temperature of steam obtained by the heat recovery. Thus, so-called carbon troubles caused in the thermal cracking of heavy oil-containing raw materials and heat recovery in conventional techniques can be overcome and a long time operation is made possible by providing the quenching device.

[Fused salt separating device]

The fluid mixture of the cracking products, steam and fused salt discharged from the quenching device is sent into the fused salt-separating device wherein it is divided into the fused salt and a gaseous substance. It is desirable that the separating device has as high an efficiency as possible so that the mist of fused salt is not entrained on the gaseous substance as much as possible. The separating device may be of an ordinary cyclone type.

When the fluid mixture passes through the quenching device and the fused salt-separating device, temperature thereof is 400°–650° C. Among the cracking products, a part of coke and high boiling products is included in the fused salt. The amount of the inclusion is increased as the raw hydrocarbons become heavier.

[Fused salt acceptor]

The acceptor comprises three chambers, i.e., settling tank, regeneration tank and fused salt-circulating pump chamber.

The settling chamber has functions of settling metal substances and sludges in the raw hydrocarbons which contaminate the fused salt and taking out thus settled precipitates from the bottom thereof.

The regeneration tank has a function of regenerating and thereby recovering sulfur compounds contained in the raw hydrocarbons after they are reacted with the fused salt. The reaction product of sulfur and the fused salt (e.g., an alkali metal carbonate, the alkali metal being referred to as M) is represented by the formula: $M_2S$. An increase in this sulfur compound is undesirable when the fused salt is circulated, since it elevates melting point and viscosity. In the regeneration tank, $CO_2$ and $H_2O$ are introduced to recover $M_2S$ and $H_2S$ as follows:

$$M_2S + CO_2 + H_2O \rightarrow M_2CO_3 + H_2S \uparrow$$

This reaction is exothermic. Temperature in the tank is controlled by changing temperatures of $CO_2$ and $H_2S$ to be fed. Reaction temperature is preferably 400°–650° C.

Concentration of the sulfur compounds in the fused salt varies depending on sulfur content of the raw hydrocarbons. For example, if low sulfur hydrocarbons such as naphtha, kerosine and Minas crude oil are used, the fused salt contains a small amount of sulfur compounds, since water gas-forming reaction occurs to form $CO_2$ in the thermal cracking zone. Further, in the presence of the diluting steam, the sulfur compounds in the fused salt reach the equilibrium by said regeneration reaction. Thus, the regeneration tank is not always required. Residence time of the fused salt in the tank and amounts of $CO_2$ and $H_2O$ to be fed are altered depending on sulfur content of the raw hydrocarbons.

The circulating pump chamber is required for the circulation of the fused salt. The pump used herein may be of any type. For example, an ordinary vertical centrifugal pump may be used. Condensed high boiling products such as coke and tar included in the fused salt can be discharged through a drain of the settling tank, gasified by a suitable means in the settling tank or returned into the fused salt-mixing zone by means of a fused salt-circulating pump.

[Quenching oil-mixing zone]

The gaseous substance separated out from the fused salt in the fused salt-separating device has a temperature of generally 400°–650° C. The gaseous substance comprises the thermal cracking gas, steam, by-produced cracking oil, coke, tar and fused salt mist. The gaseous substance is sent into the quenching oil-mixing zone for separating out the by-produced cracking oil, coke, tar and fused salt mist and also for recovering heat. The quenching oil-mixing zone has functions of cooling the gaseous substance by mixing the same with the by-produced cracking oil (quenching oil), feeding the mixture smoothly into the distillation column arranged downstream, preventing trouble caused by the condensation of coke, tar and fused salt mist contained in the gaseous substance on the walls of the pipe of the lines and the distillation column, and exhibiting an effect of cleaning the lines. Heat is recovered herein by the formation of low pressure steam.

[Distillation column]

In the distillation column, oil is recovered from the mixture sent from the quenching oil-mixing zone and the thermal cracking gas is also recovered. The thermal cracking gas is then sent to a step of separating olefins. On the other hand, the by-produced cracking oil is recovered at the bottom of the column and sent into said quenching oil-mixing zone for the use as the quenching oil. The by-produced cracking oil is thus circulated. A part of the cracking oil formed in a large quantity is taken out and sent into the coil treatment device. If necessary, low boiling and medium boiling oils may be taken out through side cut lines (not shown).

[Oil treatment device]

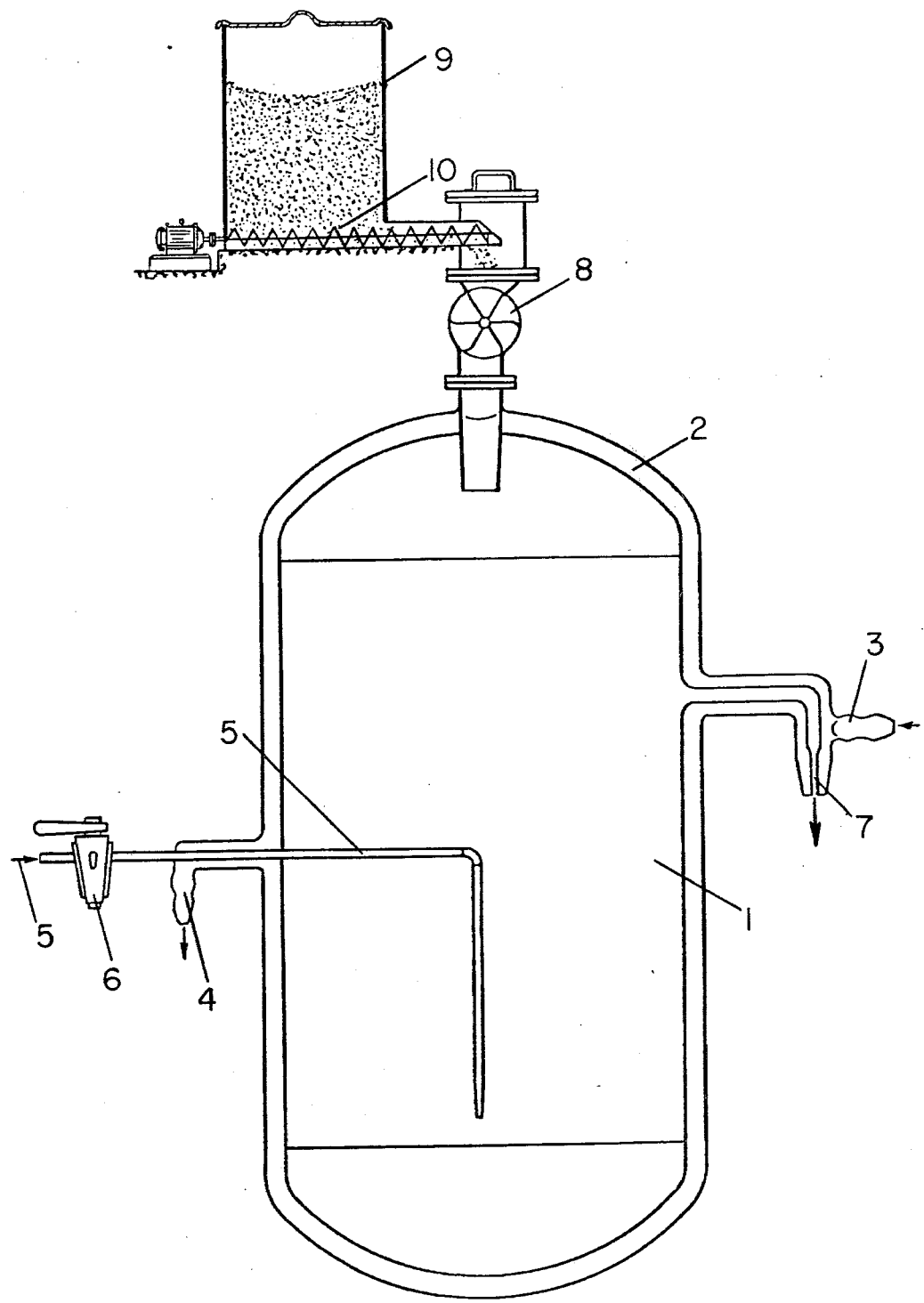

PROCESS FOR THE ELECTROSTATIC SEPARATION OF CRUDE POTASH SALTS

This is a continuation or application Ser. No. 792,334, filed Apr. 29, 1977, now abandoned.

For the separation of crude potash salts into their components, electrostatic separating processes have been used. These processes depend upon the differences in conductivity of the components of the mixture and rest mainly on the finding that the film of alkali which forms on the surface of the mixed salt particles due to absorption of humidity from the ambient air develops on crystals of certain components of the crude salt at higher temperatures and at lower humidities than on the crystals of other components. For these processes, as described, for example, in the German Pat. Nos. 1,060,331 and 1,092,401, a previous chemical conditioning of the mixed salts is not required. However, these processes require a high expenditure in power and apparatus. For example, these processes require the use of roller separators since this type of separator will assure the necessary contact of the dressing material with an electrode. However, with these separators, a specific separator width an hour may be achieved.

Another development for the electrostatic separation of the components of the crude potassium salt uses the opposite electric frictional charge of the individual components to accomplish a separation in the electrostatic field. This phenomenon, as is well known, rests essentially on the fact, that in case of frictional contact of two bodies, the material which has the higher dielectric constant will be charged positively. Thus, the mixtures that are to be separated are moved in a fine dispersion across frictional surfaces made of substances having dielectric constants which lie between those of the components of the mixture that are to be separated. Mixtures treated in this manner may be separated in so-called free-fall separators as well as in roller separators. However, the separation effected by the frictional pretreatment of the material to be separated is not altogether satisfactory.

Therefore, the finding that the variable contact-electrical chargings of the components of the crude potassium salt is greatly improved by conditioning agents, and that certain temperatures and humidities of the atmosphere must be maintained during the electrostatic separation whenever the separation is accomplished in free-fall separators, represented an essential step forward.

Thus, for example, according to German Pat. No. 1,076,593, it is known that crude potash salts, which have been ground to a fine state, may be conditioned for electrostatic separation by mixing and thus contacting the crude salt with a carboxylic acid having at least three C-atoms in the molecule. Among the carboxylic acids which have been used as conditioning agents, either singly or in admixture, are included, for example, benzoic, phthalic, salicylic, cinnamic, atropic, phenylacetic and vanillic acid, as well as their salts or simple substitution products. Still other materials which have been used to condition crude potash salts for electrostatic separation, include nitrosonaphthols and sulfonates or sulfates which contain one or more $SO_3Me$ or $SO_4Me$ groups and at least six C-atoms in the molecule, wherein Me is a metal ion, such as an alkali metal ion.

According to German Pat. No. 1,076,593, it has been known to apply the above conditioning agents in solid or liquid form. Thus, from German Pat. No. 1,076,593, it is known to apply the conditioning agents to carrier substances and to mix the latter with the crude salt. It has also been disclosed, for example, in German Pat. No. 2,213,370, to use basic or acid gases, such as ammonia, hydrogen chloride, as auxiliary conditioning agents, which by themselves have no effect for selective charging.

The methods of operation according to the status of the prior art have the disadvantage that the conditioning agents must be applied in quantities of 100 g per ton of crude salt and more, in order the achieve optimum separating effects.

Another technical disadvantage lies in the fact that mixing apparatuses are needed for the intermixing of the conditioning agents with the crude potash salt, which require a high amount of investment and operating costs.

Furthermore, the processes of the prior art have the disadvantages that as a result of the mechanical mixing of the crude salt with the conditioning agent, the application of the chemicals takes place unevenly. This causes large parts of the surface of the crude salt not to be conditioned at all or else only insufficiently, thus resulting in a lowering of the selective charge exchange. Correspondingly, the separating effect decreases and the quantity of agent material rises.

It is the task of the invention, to avoid these disadvantages and to carry out the electrostatic separation of crude potash salts while reducing the quantity of conditioning agents employing and avoiding a mixing apparatus, while at the same time, increasing the separating effect and the profitability of the process.

In accordance with the present invention, a process has been found for the electrostatic separation of crude potash salts into its components, which process requires the use of a reduced quantity of conditioning agents when carried out at a relative humidity of 2 to 30%. The present process is characterized in that the crude potash salt, ground to disintegration, and advantageously to an average particle size of about 0.25 to about 2 mm., is brought into contact with the conditioning agent which has been converted to the gaseous state, such that the latter draws up onto the surfaces of the salt crystals by absorption. The quantity of the conditioning agent which contacts the salt is adjusted by variation of the evaporation temperature and/or by variation of the quantity of heated air and/or gas, serving as carriers, whereafter the conditioned salt is separated in an electric field into two or more fractions, the fractions being removed and the conditioning agent material being returned to the charge material of the process.

It was found, furthermore, that the quantity of the conditioning agent can be adjusted at constant evaporation temperature by variation of the quantity of air and/or gas serving as a carrier material.

Moreover, it was found that the quantity of the conditioning agent, while the quantity of carrier is constant, can be adjusted by variation of the evaporation temperature.

It was further found that the temperature of the crude potash salt can be adjusted between ambient temperature and 100° C.

It was found furthermore that the liquid or solid or the sublimable conditioning agent can be evaporated through heating and can be brought into contact with the crude potash salt.

Moreover, it was found that the liquid or solid or sublimable conditioning agent can be mixed with a gaseous carrier agent in the gaseous state, and then can be brought into contact with the crude potash salt.

It was further found that the liquid or solid or sublimable conditioning agent can be evaporated by heating, can be mixed with the gaseous carrier agent, and then can be brought into contact with the crude potash salt.

An evaporation apparatus to carry out the process of the invention was found, which is characterized in that it consists of an evaporation vessel 1 having an outside heating jacket 2. An inlet tube 3 and an outlet tube are provided for supplying and withdrawing a heating fluid to the jacket 2. An inlet pipe, bent downwards, may be provided through the wall of the vessel 1 for introducing a gaseous carrier agent into the evaporation chamber. The inlet pipe 5 may be provided with a control valve 6 for the regulation of the quantity of the carrier agent introduced into the evaporation chamber. In addition, the apparatus is provided with an outlet nozzle 7 for discharging evaporated conditioning agent, possibly in admixture with the gaseous carrier agent, from the evaporation chamber.

The apparatus is also characterized in that it bears on its upper part, a bucket wheel sluice 8, through which the conditioning agent is introduced into the evaporation chamber.

For the evaporation of the conditioning agent, the evaporation apparatus shown in the FIGURE is used. The apparatus consists of the evaporation vessel, which is surrounded by a heating jacket 2 for heating fluid. The heating fluid flows in at the inlet tube 3 and flows out again through the outlet tube 4. The heated carrier agent (air and/or an inert gas) for the conditioning agent to be evaporated, is admitted through the inlet tube 5 into the evaporation chamber 1. The regulation of the quantity of the carrier agent is accomplished by means of the control valve 6. The carrier agent, charged with conditioning agent, exits at the outlet nozzle 7. It is also possible to introduce the evaporated conditioning agent directly into a heating and charging arrangement such as, for example, a fluidized bed-dryer. In that case, the carrier agent, enriched with conditioning agents, is guided into the hot primary air, which serves for the heating of the salt, and in case of fluidized bed-dryers, simultaneously for maintaining of the fluidized salt bed.

The introduction of the conditioning agent into the evaporation chamber 1 takes place through the bucket wheel sluice 8 from a supply silo 9. When using a conditioning agent which is inclined to decompose, such as salicylic acid, it is desirable to introduce into the evaporating chamber 1, only as much conditioning agent as can evaporate in it under controlled evaporation conditions. In such case, it is desirable to provide a dosing means 10, such as a screw conveyor, for feeding the bucket wheel sluice 8.

The process of the invention will be explained by the succeeding examples.

EXAMPLE 1

A crude salt ground to a grain size of up to about 1.5 mm and containing 12.8% sylvite, 7.6% carnallite, 17.1% native magnesium sulfate and 61.2% rock salt ($K_2O$—contents 9.38%), was used in all runs. In run nos. 1–3, the method of operation was in accordance with the prior art, i.e., in these runs, 100 g/t of salicylic acid in solid form was mixed intensively in a mixer with the crude salt. The conditioning of the crude salt in the case of run nos. 4–6, was in accordance with the process of the invention. In these latter runs, 50–100 g/t of salicylic acid in the form of an air/salicylic vapor mixture was brought into contact with the crude salt in a pipe chute, without the use of any mixer. The evaporation of the salicylic acid took place at 100° C. for run no. 4 and at 160° C. for run nos. 5 and 6. The quantity of conditioning agent in the mixture was adjusted by varying the quantity of air at 160° C., serving as the carrier material.

The crude salt, conditioned with salicylic acid, was then heated at 10% relative humidity and was electrically charged by moving and contacting the crude salt particles over a frictional surface in a known manner. The charged salt was then electrostatically separated in a tubular, free-falling separator at 4 kV/cm. The results tabulated below were obtained in a continuously operating separator having a throughput of 50 kg/h. The middlings fraction—1 was circulated and completely split into concentrate and residue.

TABLE 1

| Run No. | Salicylic Acid Quantity g/t | Concentration $K_2O$ % | Concentration Kies* % | Residue $K_2O$ % | Residue Kies* % | Yield $K_2O$ % | Yield Kies* % | Quantity of Middlings % |
|---|---|---|---|---|---|---|---|---|
| 1 | 100 | 20.2 | 35.9 | 1.5 | 3.4 | 90.7 | 88.4 | 56 |
| 2 | 100 | 21.3 | 38.2 | 1.4 | 3.0 | 91.0 | 89.6 | 64 |
| 3 | 100 | 20.4 | 36.6 | 1.4 | 3.0 | 91.4 | 89.9 | 59 |
| 4 | 50 | 20.7 | 36.8 | 1.1 | 2.7 | 93.3 | 90.8 | 43 |
| 5 | 75 | 20.8 | 36.9 | 1.0 | 2.6 | 93.8 | 91.3 | 46 |
| 6 | 100 | 22.0 | 39.3 | 1.1 | 2.5 | 93.0 | 91.0 | 48 |

*native magnesium sulfate

Middlings volume in % is related to crude salt input. Thus, the higher the middlings volume, the lower the amount of crude salt that can be processed per unit of time in a given installation.

The technical advantages of the present invention can be gathered from the data presented in Table 1. For example, Table 1 indicates that the quantity of conditioning agent used can be reduced from 100 g/t to 50 g/t. In this regard, the use in run nos. 5 and 6 of 75 g/t and 100 g/t, respectively, does not show any improvement on the separation of the crude salt, when compared to the use of 50 g/t in run no. 4. Similarly, run nos. 4–6 illustrate yield rises for $K_2O$ by 1.6–3.1% and for native magnesium sulfate by 0.9–2.9%, as compared to run nos. 1–3. In addition, the middlings quantity drops clearly from 56–64% for run nos. 1–3 to 43–48% for run nos. 4–6. Finally, according to the process of the invention, a mixer which causes high investment and operating costs, may be omitted.

Thus, the reduction of the required quantity of salicylic acid, at a simultaneously increased separating effect, while saving a high cost mixer, leads to a considerable increase of the profitability of the process of the invention. A further increase of the profitability is achieved by a reduction of the quantity of middlings, which leads to an increase of 8–21% of the crude salt processing in an equal installation.

EXAMPLE 2

Preconcentrates of sylvite, carnallite and native magnesium sulfate, which were obtained by separation from rock salt after conditioning with salicylic acid, were treated with trichloroacetic acid for after-purification. Run nos. 7 and 8 were performed in accordance with the prior art (German Pat. No. 1,792,120), such that 100 g/t of trichloroacetic acid, in solid form, was used as the conditioning agent. In the case of run nos. 9-13, the process of the invention was employed such that 15-75 g/t of trichloroacetic acid, in a gaseous state, were added. The addition of the evaporated trichloroacetic acid took place in a fluidized bed-dryer using air as the carrier gas. The evaporation of the trichloroacetic acid took place at 70°-125° C. The quantity of air, serving as a carrier agent, was kept constant; the quantity of trichloroacetic acid being adjusted by variation of the evaporation temperature. The heating and charging took place at 10% relative humidity in the fluidized bed-dryer. (Obtained from the firm of Escher-Wyss-Ravensburg).

A tubular free-fall separator at 4 kV/cm, was used for the separation. The middlings were completely recycled into concentrate and residue.

The technical progress of the process of the invention is clear from the results set forth in Tables 2 and 3.

The results, as in the status of the prior art with 100 g/t of trichloroacetic acid in solid form, which were mixed in a mixer with the salt, show $K_2O$ yield from 78.3% at 15 g/t of trichloroacetic acid, to 95.2% at 60 g/t of trichloroacetic acid. The native magnesium sulfate yield rises correspondingly from 72.4% to 97.7%. As seen in run no. 12, the highest selectivity for $K_2O$ yield was achieved with about 60 g/t of trichloroacetic acid.

TABLE 2

Starting Materials:

| Run No. | % $K_2O$ | % Sylvite | % Carnallite | % Native Magnesium Sulfate | % Rock Salt |
|---|---|---|---|---|---|
| 7 | 19.1 | 24.0 | 23.3 | 35.3 | 17.3 |
| 8 | 17.9 | 17.1 | 42.0 | 23.0 | 17.6 |
| 9 | 18.0 | 17.2 | 41.8 | 22.8 | 18.1 |
| 10 | 17.1 | 17.8 | 34.5 | 26.5 | 20.9 |
| 11 | 19.1 | 23.8 | 23.6 | 35.1 | 17.3 |
| 12 | 17.3 | 16.4 | 40.8 | 23.0 | 19.4 |
| 13 | 18.1 | 17.3 | 42.2 | 24.8 | 15.6 |

TABLE 3

Results:

| Run No. | Conditioning Agent g/t | Concentrate $K_2O$ % | Concentrate Kies* % | Concentrate NaCl % | Residue $K_2O$ % | Residue Kies* % | Residue NaCl % | Yield $K_2O$ % | Yield Kies* % |
|---|---|---|---|---|---|---|---|---|---|
| 7 | 100 | 19.6 | 43.4 | 3.6 | 18.0 | 27.1 | 40.9 | 67.0 | 74.9 |
| 8 | 100 | 18.4 | 27.8 | 2.5 | 18.0 | 10.9 | 56.2 | 74.8 | 88.2 |
| 9 | 15 | 20.1 | 21.3 | 4.4 | 13.4 | 19.4 | 53.3 | 78.3 | 72.4 |
| 10 | 30 | 19.3 | 32.3 | 4.4 | 9.4 | 3.4 | 79.6 | 88.8 | 97.3 |
| 11 | 45 | 21.8 | 40.9 | 3.2 | 9.0 | 13.7 | 69.8 | 90.0 | 91.7 |
| 12 | 60 | 20.3 | 27.9 | 2.5 | 4.3 | 11.3 | 80.0 | 95.4 | 91.5 |
| 13 | 100 | 19.8 | 29.9 | 3.7 | 8.8 | 3.8 | 78.5 | 92.4 | 97.7 |

*native magnesium sulfate

As can be seen from Tables 1-3, the process of the present invention results in a lowering the quantity of conditioning agent required, a saving of a high cost mixer, an increase in the selectivity of the separation, and a reduction in the middlings quantity, which is reduced as in example 1 by 10-20%. Accordingly, the present process leads to an increase of profitability and thus a considerable technical progress as compared to the method of operation according to the status of the prior art.

What is claimed is:

1. A process for the electrostatic separation of a crude potash salt into the components thereof, which comprises:
   grinding the crude salt to an average particle size of about 0.25 to 2 mm.;
   contacting the ground crude salt with a normally liquid or solid conditioning agent which has been converted into the gaseous state, such that said gaseous conditioning agent draws up onto the surfaces of the crude salt particles by absorption, said gaseous conditioning agent being essential to the electrostatic separation;
   electrically charging the salt at a relative humidity of 2-30%;
   passing the conditioned charge crude salt particles through an electrostatic field to separate the crude salt into at least two fractions and to separate said conditioning agent therefrom; and
   recovering a potash-enriched product fraction whereby substantially less conditioning agent is required than would otherwise be the case if a non-vaporized conditioning agent were employed.

2. The process of claim 1, wherein said conditioning agent is trichloroacetic acid.

3. The process of claim 1, wherein said conditioning agent is salicylic acid.

4. A process according to claim 1, wherein the quantity of said conditioning agent that is drawn up onto the crude salt particles is adjusted by selectively varying the evaporation temperature, the volume of heated air or inert gas which is used as a carrier material for said conditioning agent, or both the evaporation temperature and the volume of carrier material.

5. The process of claim 4, wherein the quantity of said conditioning agent is adjusted at constant evaporation temperature by varying the quantity of said carrier material.

6. The process of claim 5, wherein said conditioning agent is evaporated by heating, is mixed with said carrier material, and is then brought in contact with the crude potash salt.

7. The process of claim 4, wherein said conditioning agent is evaporated by heating, is mixed with said carrier material, and is then brought in contact with the crude potash salt.

8. The process of claim 4, wherein the quantity of the conditioning agent at a constant quantity of said carrier material is adjusted by varying the evaporation temperature.

9. A process according to claim 1, wherein the conditioning agent employed for contacting the ground crude salt, consists essentially of said gaseous conditioning agent.

10. A process for the electrostatic separation of crude potash salts into its components, while reducing the used quantity of conditioning agents at relative humidities of 2–30%, characterized in that the crude potash salt, ground to an average particle size of 0.25–2 mm., is brought into contact with a normally liquid or solid conditioning agent converted into the gaseous state, so that the latter, as the essential conditioning agent, draws up onto the surfaces of the salt crystals by absorption, whereby the quantity of the conditioning agent is adjusted by variation of the evaporation temperature and/or by variation of the volume of heated air and/or gas, serving as carrier material, after that the separation into two or more product fractions and a recycle fraction takes place in the electric field, the product fractions are withdrawn and the recycle fraction is returned to the feed material.

11. A process according to claim 10, wherein the conditioning agent is salicylic acid.

12. A process according to claim 10, wherein the conditioning agent is trichloroacetic acid.

13. The process of claim 8, wherein said conditioning agent is evaporated by heating, is mixed with said carrier material, and is then brought in contact with the crude potash salt.

* * * * *